US008933691B2

(12) United States Patent
Galka et al.

(10) Patent No.: US 8,933,691 B2
(45) Date of Patent: Jan. 13, 2015

(54) ROTARY POSITION SENSOR (75) Inventors: William E. Galka, Caro, MI (US);
Bradley J. Roche, Cass City, MI (US);
David L. Speirs, Cass City, MI (US);
Eric G. Zbytowski, Alpena, MI (US)

(73) Assignee: Walbro Engine Management, L.L.C., Tucson, AZ (US)

( * ) Notice: Subject to any disclaimer, the term of this patent is extended or adjusted under 35 U.S.C. 154(b) by 720 days.

(21) Appl. No.: 12/771,331

(22) Filed: Apr. 30, 2010

(65) Prior Publication Data

US 2010/0219817 A1    Sep. 2, 2010

Related U.S. Application Data (63) Continuation-in-part of application No. 12/739,787, filed as application No. PCT/US2008/081360 on Oct. 27, 2008.

(60) Provisional application No. 61/094,973, filed on Sep. 7, 2008, provisional application No. 61/000,451, filed on Oct. 27, 2007.

(51) Int. Cl.
*G01B 7/30* (2006.01)

(52) U.S. Cl.
CPC ........................ *G01B 7/30* (2013.01)
USPC .............. 324/207.25; 324/207.2; 324/207.21; 324/207.22; 324/207.23; 324/207.24

(58) Field of Classification Search
CPC ..................................... G01B 7/30; G01B 7/14
USPC ..................................................... 324/207.25
See application file for complete search history.

(56) References Cited

U.S. PATENT DOCUMENTS

| 3,983,882 | A | | 10/1976 | Billings |
| 4,271,093 | A | | 6/1981 | Kobayashi |
| 4,893,502 | A | | 1/1990 | Kubota et al. |
| 5,055,781 | A | | 10/1991 | Sakakibara et al. |
| 5,067,460 | A | | 11/1991 | Van Duyne |
| 5,278,497 | A | | 1/1994 | Ariyoshi |
| 5,332,965 | A | | 7/1994 | Wolf et al. |
| 5,444,369 | A | * | 8/1995 | Luetzow .................... 324/207.2 |
| 5,544,000 | A | | 8/1996 | Suzuki et al. |
| 5,545,986 | A | | 8/1996 | Ariyoshi et al. |
| 5,572,120 | A | | 11/1996 | Takaishi et al. |
| 5,625,289 | A | | 4/1997 | Daetz et al. |
| 5,650,721 | A | | 7/1997 | Van Den Berg et al. |
| 5,668,471 | A | | 9/1997 | Lequesne et al. |
| 5,698,778 | A | | 12/1997 | Ban et al. |
| 5,757,179 | A | | 5/1998 | McCurley et al. |
| 5,801,529 | A | | 9/1998 | Umemoto et al. |

(Continued)

OTHER PUBLICATIONS

Written Opinion & International Search Report for PCT/US08/81360, Jun. 8, 2009, 6 pages.

*Primary Examiner* — Tung X Nguyen
*Assistant Examiner* — Son Le
(74) *Attorney, Agent, or Firm* — Reising Ethington P.C.

(57) ABSTRACT

A rotary position sensor for determining the rotary position of a rotary component may include a sensor and a magnet. The sensor may be responsive to a characteristic of a magnetic field that changes as the magnetic field moves. The magnet may be carried by the rotary component for rotation with the rotary component and have an anti-rotation feature to prevent rotation of the magnet relative to the rotary component to maintain a desired rotary position of the magnet.

13 Claims, 4 Drawing Sheets

(56) References Cited

U.S. PATENT DOCUMENTS

| | | |
|---|---|---|
| 5,982,170 A | 11/1999 | McCurley et al. |
| 6,020,736 A | 2/2000 | Aoyama et al. |
| 6,104,187 A | 8/2000 | Marx et al. |
| 6,118,216 A | 9/2000 | Marlor |
| 6,288,534 B1 | 9/2001 | Starkweather et al. |
| 6,316,935 B1 | 11/2001 | Vanzuilen |
| 6,323,641 B1 | 11/2001 | Allwine |
| 6,323,643 B1 | 11/2001 | Kordecki |
| 6,448,763 B1 | 9/2002 | Spellman |
| 6,498,479 B1 | 12/2002 | Hamaoka et al. |
| 6,512,974 B2 | 1/2003 | Houston et al. |
| 6,534,969 B1 | 3/2003 | Dietmayer |
| 6,585,235 B2 | 7/2003 | Pattullo |
| 6,593,732 B2 | 7/2003 | Dammkohler et al. |
| 6,611,790 B1 | 8/2003 | Reichl et al. |
| 6,614,223 B2 | 9/2003 | Schroeder et al. |
| 6,688,585 B2 | 2/2004 | Braun et al. |
| 6,822,441 B1 | 11/2004 | Moreno et al. |
| 6,854,443 B2 | 2/2005 | Keefover et al. |
| 6,883,494 B2 | 4/2005 | Kurita et al. |
| 6,928,996 B2 | 8/2005 | Tobinai |
| 6,956,368 B2 | 10/2005 | Johnson et al. |
| 7,000,595 B2 | 2/2006 | Andersson et al. |
| 7,032,617 B2 | 4/2006 | Kurita et al. |
| 7,036,791 B2 | 5/2006 | Wiese |
| 7,161,349 B2 | 1/2007 | Itoh et al. |
| 7,182,063 B2 | 2/2007 | Keefover et al. |
| 7,275,517 B2 | 10/2007 | Kurita et al. |
| 7,323,866 B1 | 1/2008 | Uryu et al. |
| 7,339,371 B2 | 3/2008 | Shimomura et al. |
| 7,546,836 B2 | 6/2009 | Andersson et al. |
| 2002/0067160 A1* | 6/2002 | Oomkes ............... 324/207.2 |
| 2003/0121496 A1 | 7/2003 | Matte |
| 2005/0264282 A1 | 12/2005 | Kawashima et al. |
| 2006/0119353 A1* | 6/2006 | Nakano et al. ......... 324/207.25 |
| 2006/0274040 A1* | 12/2006 | Passaro et al. ............ 345/161 |
| 2007/0000455 A1* | 1/2007 | Akiyama et al. ............ 123/19 |
| 2007/0290680 A1* | 12/2007 | Hattori ................. 324/207.25 |

\* cited by examiner

ROTARY POSITION SENSOR

REFERENCE TO RELATED APPLICATIONS

This application is a continuation-in-part of U.S. patent application Ser. No. 12/739,787, filed Apr. 26, 2010 and incorporated herein by reference in its entirety, which is a national stage application from PCT/US08/81360 filed Oct. 27, 2008 and claims the benefit of U.S. Provisional Patent Application No. 61/094,973 filed on Sep. 7, 2008, and U.S. Provisional Patent Application No. 61/000,451 filed on Oct. 27, 2007.

TECHNICAL FIELD

The present disclosure relates generally to rotary components and more particularly to a position sensor for a rotary component, for example, a shaft and/or valve.

BACKGROUND

Many engines utilize a throttle valve to control or throttle air flow to the engine in accordance with a demand on the engine. Such throttle valves may be used, for example, in throttle bodies of fuel injected engine systems and in carburetors of carbureted engine systems. Many such throttle valves include a valve head carried on a shaft that is rotated to change the orientation of the valve head relative to fluid flow in a passage, to vary the flow rate of the fluid in and through the passage. Other applications also use components that rotate, and the position of these components may need to be known for feedback control or other reasons.

SUMMARY

A rotary position sensor for determining the rotary position of a rotary component may include a sensor and a magnet. The sensor may be responsive to a characteristic of a magnetic field that changes as the magnetic field moves. The magnet may be carried by the rotary component for rotation with the rotary component and have an anti-rotation feature to prevent rotation of the magnet relative to the rotary component to maintain a desired rotary position of the magnet.

In another exemplary form, an apparatus may include a body having an air passage through which air flows, and a valve rotatable relative to the body. The valve may have a valve shaft and a valve head carried by the valve shaft for rotation relative to the air passage between a first position at a first degree of opening and a second position at a second degree of opening that is greater than the first degree of opening. A sensor may be carried by the body and responsive to a characteristic of a magnetic field that changes as the magnetic field moves. And a magnet may be carried by the valve shaft for co-rotation with the valve shaft and have an anti-rotation feature to prevent rotation of the magnet relative to the valve shaft to maintain a desired rotary position of the magnet. The magnet may be carried directly by the valve shaft, or by another component that is coupled to or otherwise associated with the valve shaft.

DETAILED DESCRIPTION OF PREFERRED EMBODIMENTS

Figure 1:
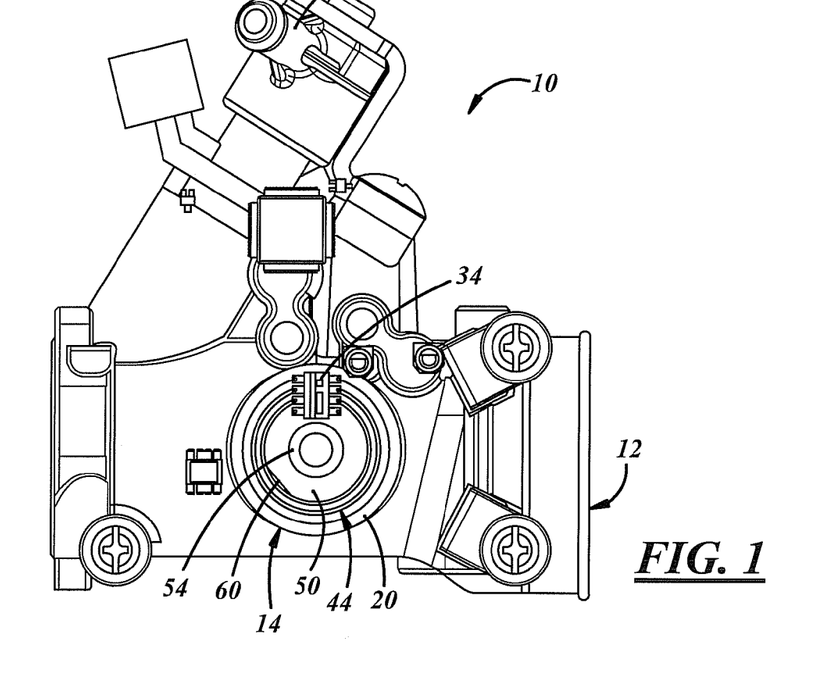
FIG. 1 is a side view of one implementation of a throttle body having a throttle valve, and showing the position of a rotary position sensor relative to the throttle valve, where a circuit board and related housing and components have been removed to more clearly show the sensor position.
Figure 2:
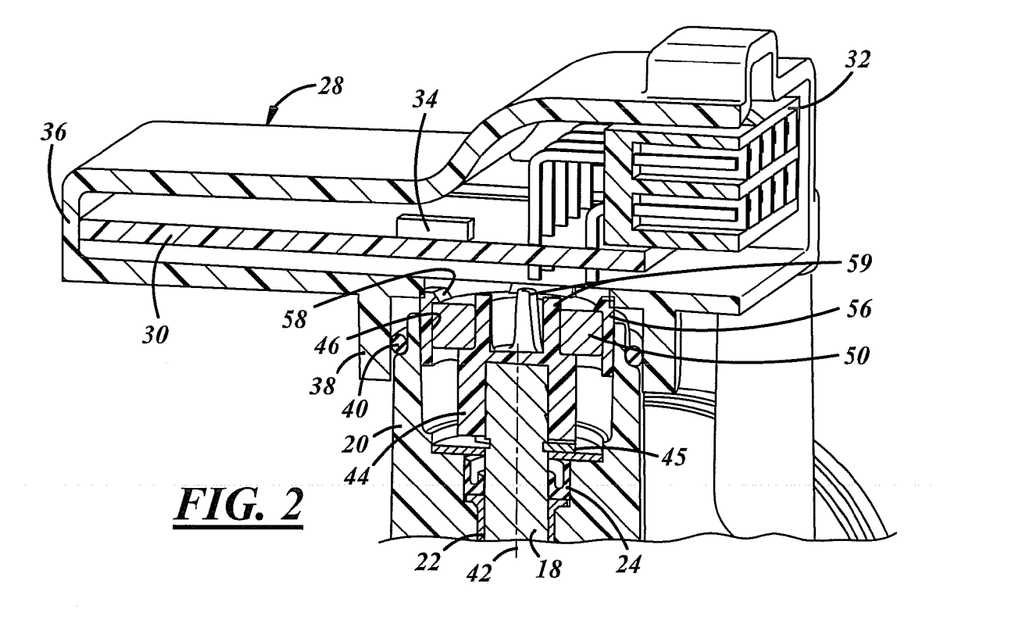
FIG. 2 is a fragmentary sectional view showing a portion of a control module including the rotary position sensor and also showing an end of a shaft of the throttle valve.

Referring in more detail to the drawings, FIG. 1 illustrates a throttle body 10 which may be used in a fuel injection based engine fuel delivery system. The throttle body 10 includes an air passage 12 through which air is delivered to the engine and a throttle valve 14 (FIG. 4) arranged to control air flow through the air passage 12 as a function of the extent to which the valve 14 is open. In the implementation shown, the throttle valve 14 is a butterfly type valve with a flat, disc-shaped valve head 16 located within the air passage 12. The valve head 16 is carried by a rotary throttle valve shaft 18 that extends through the air passage 12 and is rotated between a closed position (or idle position) and a wide open position. An end of the valve shaft 18 may extend outwardly from the body 10, and may be received at least in part within a cylindrical projection 20 (FIGS. 1 and 2) of the body 10. As shown in FIG. 2, one or more bearings and seals 22, 24 may be provided between the projection 20 and the throttle shaft 18. In this particular embodiment, a fuel injector 26 (FIG. 1) may be carried by the throttle body 10. Likewise, a control module 28 (FIG. 2) may also be carried by the throttle body 10.

Figure 3:
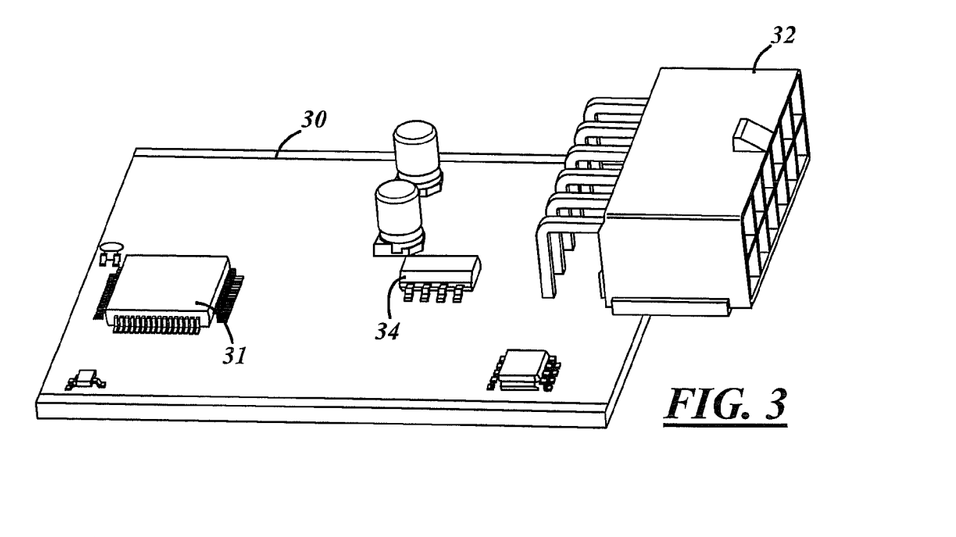
FIG. 3 is a perspective view of a portion of the circuitry on a circuit board of the control module of FIG. 2.

Referring now to FIGS. 2 and 3, the control module 28 may include a circuit board 30, one or more controllers or processors (e.g. 31 in FIG. 3), a main connector 32, and a rotary position sensor 34. Referring to FIG. 2, the control module 28 may include a housing 36 carried by the throttle body 10. To connect these components together, the housing 36 may have an annular skirt or flange 38 disposed around the projection 20 with a seal 40 disposed between them. The rotary position sensor 34 may be disposed on the circuit board 30, in the area of the connection between the housing 36 and projection 20 so that the sensor 34 is located in the area of the end of the throttle valve shaft 18, as will be discussed in more detail later. The circuit board 30 may be located axially spaced (relative to the rotary axis 42 of the shaft 18) from an end of the throttle shaft 18, as shown, or the throttle shaft 18 could extend beyond or through a portion of the circuit board 30, if desired. It may be desirable to have the throttle shaft 18 extend through the circuit board, for example, in an application where access to the end of the throttle shaft is desired. The circuit board 30 and/or the sensor 34 may be arranged perpendicular to the axis 42 of the throttle shaft 18.

Figure 5:
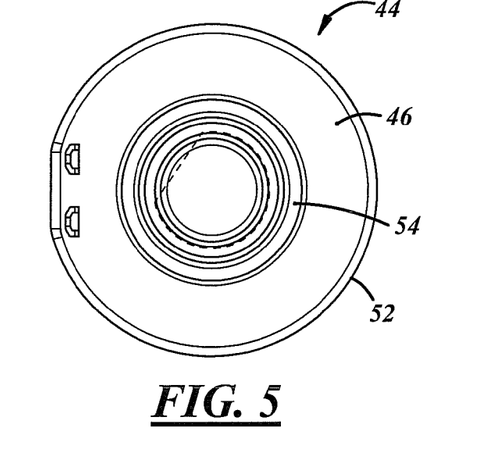
FIG. 5 is a bottom view of the rotor component.
Figure 6:
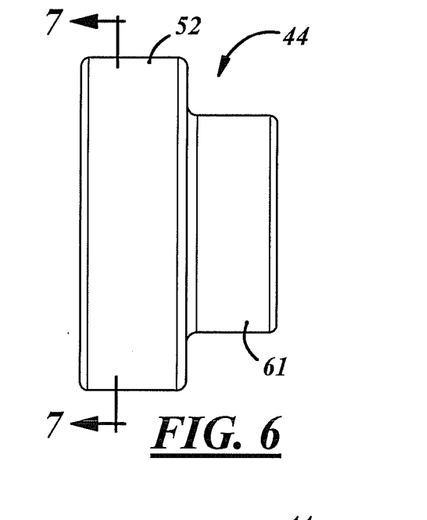
FIG. 6 is a side view of the rotor component.

A rotor component 44 may be fixed to throttle shaft 18, such as by a connector like a key or clip 45, and include a pocket 46 for retaining a magnet 50. The pocket 46 may be formed by an upstanding outer wall 52 and an upstanding inner wall 54 spaced radially inwardly from the outer wall 52 so that the pocket 46 is annular or generally annular. The outer and inner walls 52, 54 may be circumferentially continuous as shown in FIG. 1, or they may be discontinuous, that is, they may include openings or voids, or be defined by discrete spaced apart segments, pins, fingers or the like. In the example shown in FIG. 2, the outer wall 52 is defined by spaced apart fingers that each have a radially inwardly extending flange 58 adapted to overlie the magnet 50 to retain the magnet 50 in the pocket 46. The fingers 56 may be flexible so that they may flex outwardly to permit the magnet 50 to be pressed into the pocket 46, and resilient so that the return to their unflexed position and overlie the magnet 50 when the magnet is received within the pocket. Similarly, the inner wall may be defined by spaced apart pins or projections 59, each adapted to engage an inner periphery of the magnet 50. The outer and inner walls 52, 54 may extend axially a similar or different distance from each other, as desired. For example, in the exemplary form shown in FIGS. 6-9, the inner wall is shorter than the outer wall, and in another exemplary form 44' shown in FIG. 10, the inner wall 54' is the same axial height as the outer wall 52. In at least some forms of the rotor component, if desired, pocket 46 may be located toward an outer circumference of rotor component 44 and may be sized and shaped to securely receive the magnet 50. Rotor component 44, according to the exemplary embodiment shown here, is made from a non-magnetic material, such as plastic, although it could be formed from any material or combination of materials, including a magnetic material. Rotor component 44 can be keyed to throttle shaft 18 or attached in some other way that enables the two components to rotate together. In the form shown in FIGS. 5 and 8, the rotor component 44 includes an annular stem 61 having a flat 63 formed therein and adapted to mate with a complementary flat formed on the throttle valve shaft 18.

Magnet 50 may be annular, partially annular or arcuate, or of another desired shape. Magnet 50 produces a magnetic field having a distribution, orientation, direction and/or intensity that may be sensed by rotary position sensor 34, and that, at a given location of the sensor 34, varies according to the rotary position of throttle valve 14. In one embodiment, magnet 50 is made of a permanent magnetic material and is a standard ring magnet that is concentric with the throttle shaft 18. The magnet 50 may be made from a neodymium material, and may have a strength of between 8 Ampere-Meters and 25 Ampere-Meters in at least certain applications, although other types of magnets and magnets having other strengths may be used, as desired. The magnet 50 may be a single pole set magnet. The magnet 50 and/or the rotor component may include an anti-rotation feature to limit or prevent rotation of the magnet 50 relative to the pocket 46 to maintain a desired orientation of the magnet and a consistent magnetic field therefrom to facilitate determining the rotary position of the throttle valve 14 over time.

Figure 7:
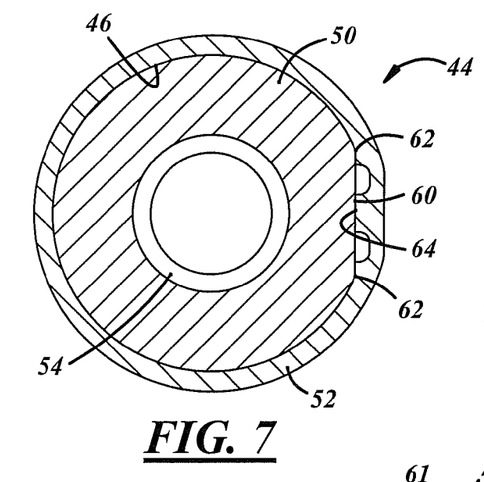
FIG. 7 is a sectional view taken along line 7-7 in FIG. 6.
Figures 10, 13B:
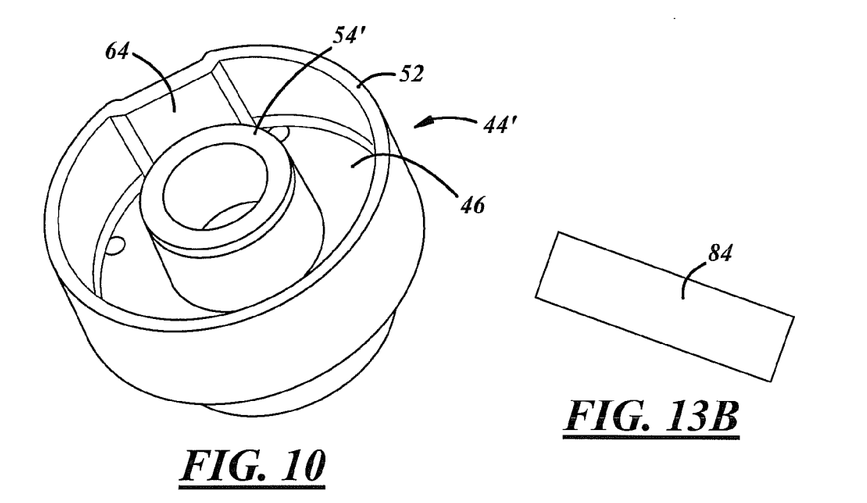
FIG. 10 is a perspective view of another exemplary rotor component.
FIGS. 13A and 13B show other exemplary forms of magnets including anti-rotation features.
Figures 11, 12, 13A:
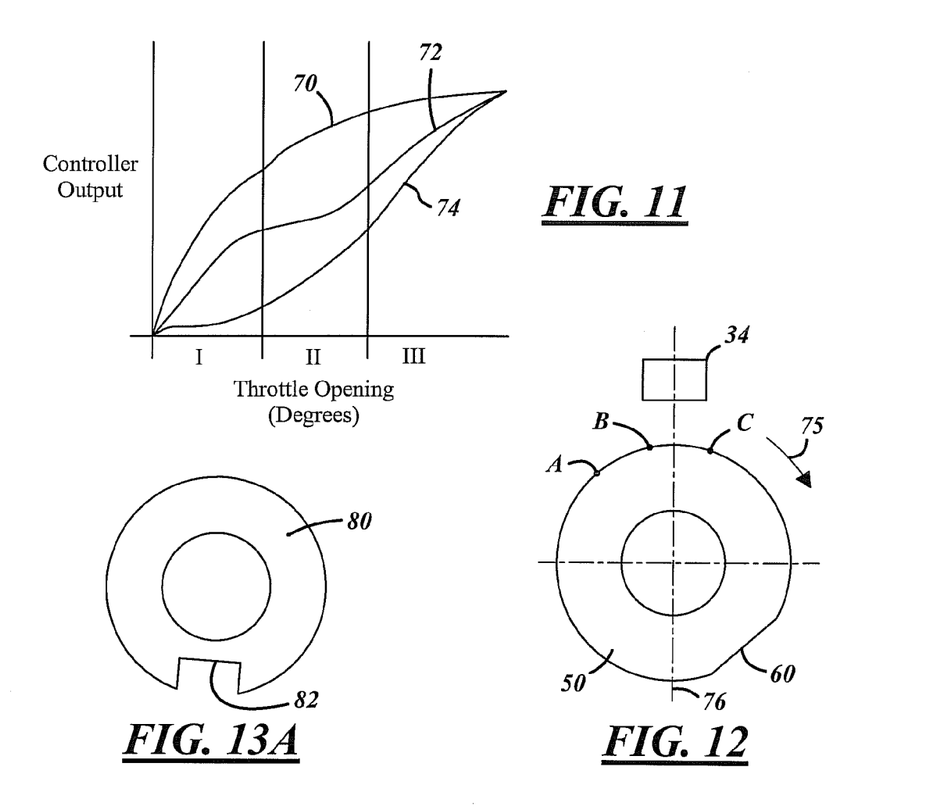
FIG. 11 is a graph of throttle valve position v. rotary position sensor output for three different magnet positions.
FIG. 12 is a diagrammatic plan view of an annular magnet and rotary position sensor, showing three different magnet positions.

In one form, as shown in FIGS. 1 and 7, the magnet 50 includes a flat surface 60 formed along its outer periphery. This flat surface provides corners or outer edges 62 (FIG. 7) that engage the inside surface of the outer wall 52 of the rotor component 44, and the engagement of the edges 62 with the outer wall 52 may increase the friction between them or otherwise increase the force required to rotate the magnet 50 relative to the pocket 46. The edges 62 may deform, score or otherwise "dig" into the inside surface of the outer wall 52. Of course, features other than a flat surface with edges may be used, such as, for example, one or more protrusions extending outwardly from the magnet, such as a knurls or teeth, or other protrusions, or indentations like a slot, hole, cavity, dimple or the like that may provide an edge or feature that resists relative movement between the magnet and rotor component. Accordingly, the inertia from even rapid rotation and stopping of the throttle valve 14 preferably does not provide a great enough force to move the magnet 50 relative to the rotor component 44. FIG. 13A shows another exemplary magnet 80 with a cutout 82 as an anti-rotation feature. FIG. 13B shows another exemplary magnet 84 that is not circular or annular. Instead, magnet 84 is a bar which may be a rectangular cube or cylindrical. The shape of magnet 84, when received in a complementarily shaped pocket, would prevent rotation of the magnet relative to a rotor component. Of course, other magnet shapes and different anti-rotation features may be used.

Figure 8:
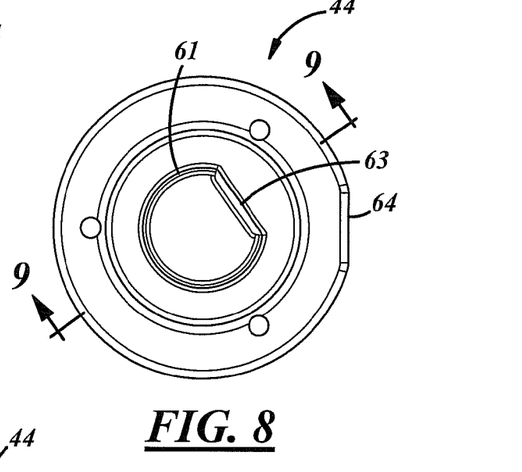
FIG. 8 is a top view of the rotor component.
Figure 9:
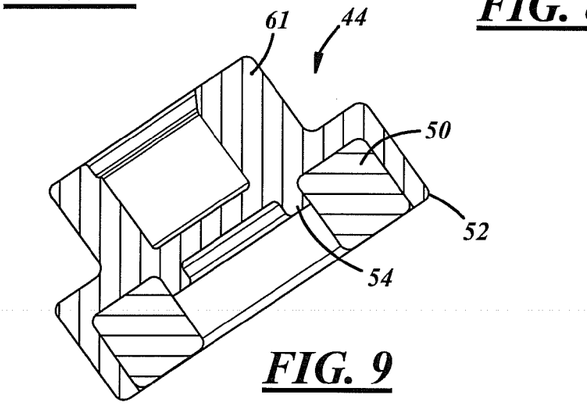
FIG. 9 is a sectional view taken along line 9-9 in FIG. 8.

In at least some implementations, such as those shown in FIGS. 7, 8 and 10, the pocket 46 may be formed complementarily to the magnet 50. That is, the pocket may be defined in part by an outer wall 52 have a flat surface 64 adapted to receive the flat surface 60 of the magnet 50. Of course, the inside wall 54 may instead or also include a flat part or other anti-rotation feature adapted to cooperate with the magnet 50 which may also have an anti-rotation feature in, on or adjacent to its inner periphery. In arrangements like these, the noncircular shape of the components may be sufficient to prevent rotation, without regard to any force or friction fit or digging in of the magnet 50 relative to the rotor component 44. Of course, in arrangements where the inner and/or outer wall of the pocket 46 are defined by individual fingers or segments, the corresponding flat surfaces may be defined at or adjacent to the fingers or segments, or otherwise, to limit or prevent rotation of the magnet 50. The magnet 50 could also be overmolded by the plastic of the rotor component 44 when the rotor component is molded. The magnet 50 could also be adhered, bonded or welded to the rotor component 44 such as by a mechanical or chemical adhesive bond to limit or prevent rotation of the magnet relative to the rotor component. The magnet may also be carried directly by the valve shaft and the anti-rotation feature may engage or otherwise cooperate with the valve shaft to maintain the position of the magnet relative to the valve shaft. In such an arrangement, the rotor component 44 may not be needed.

In an exemplary embodiment shown in FIGS. 1-4, rotary position sensor 34 is a magnetoresistive (MR) sensor that determines the angular or rotary position of throttle valve 14 by sensing at least one characteristic (for example, direction, distribution, orientation and/or strength) of a magnetic field that changes according to the position of the throttle valve 14. That is, the interface between the rotating magnet 50 and the stationary sensor 34 converts the changing magnetic field into an output voltage that varies depending on rotation of the magnet 50, and hence, on rotation of the throttle valve 14. In one form, the sensor 34 detects the changing magnetic flux direction as the magnet 50 rotates.

Rotary position sensor 34 may be mounted to circuit board 30 so that it can magnetically interact with magnet 50 and provide control module 28 with a signal corresponding to the rotary position of the throttle valve 14. The sensor 34 may include a plurality of magnetoresistive (MR) elements which may be arranged as a pair of angularly offset resistive bridges, as generally described in U.S. Patent Application Ser. No. 61/094,973. In this particular embodiment, rotary position sensor 34 is mounted to circuit board 30 such that the sensor surface is generally parallel to the rotating magnetic field, and the sensor is neither coaxial with the axis 42 of throttle shaft 18 nor is it coplanar with magnet 50. Put differently, rotary position sensor 34 can be mounted radially spaced from the axis 42 of the throttle shaft 18 and axially spaced from the magnet 50. In at least some implementations, the sensor 34 may be axially spaced from the magnet by between about 0 and 15 mm, and in some implementations the distance may be 3 mm to 15 mm. A gap of 6 mm to 7 mm is preferred in at least one implementation as being conducive to high-volume manufacturing taking into account tolerances regarding location of the magnet 50, and various dimensional tolerances of the components. The axial offset distances noted above are measured from a centerline of the sensor 34 to the closest surface of the magnet 50. The closer the sensor 34 is to the magnet 50, the stronger the signal-to-noise ratio may be, but it may be more difficult to consistently closely space the sensor 34 relative to the magnet 50 in high-volume manufacturing.

Figure 4:
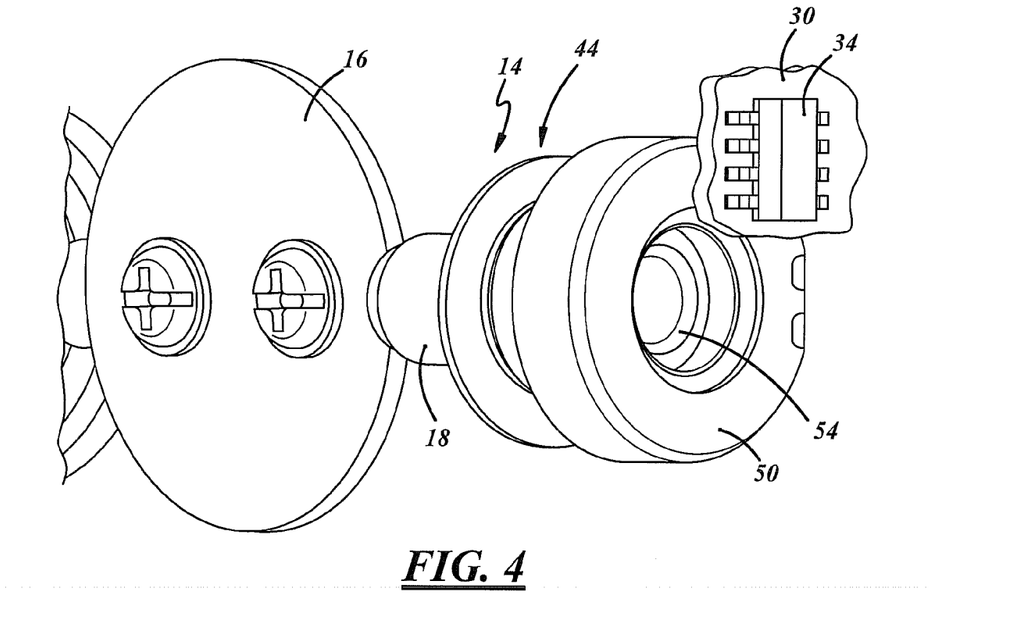
FIG. 4 is a perspective view partially exploded showing the throttle valve; a rotor component coupled to the throttle valve, and the rotary position sensor.

Further, the sensor 34 may be radially offset from the magnet 50 up to a distance of about the outside diameter of the magnet 50 plus 12 mm, with a range of offset of between about one-half to three-fourths of the outside diameter of the magnet. For example, with a magnet 50 having an outside diameter of 16 mm, the radial offset may be between 0 and 28 mm, with a range of 8 mm to 12 mm being preferred for at least one presently tested sensor, such as the sensor model ZMT32 sold by Zetex Semiconductors. The radial offset distances noted above are measured from a center of the sensor 34 to a center of the magnet 50, or a rotary axis of the magnet 50. For magnets 50 without a circular periphery, then the offset can be measured relative to a major dimension of the magnet 50, where the major dimension is the greatest dimension (e.g. length, width, thickness) of the magnet 50. The further the sensor 34 is from the magnet 50, the greater the likelihood of signal and noise variations, and weaker flux line concentrations. Depending on the particular application, it may be desirable to mount rotary position sensor 34 at a position on circuit board 30 that is as close to the axis 42 of throttle shaft 18 as possible; this includes mounting sensor 34 at a position that is radially inboard of an inside diameter of the magnet 50. That is, where the center of the sensor 34 is not offset farther than an inside radius of the magnet 50. In addition to or instead of radially offsetting the sensor 34, the magnet 50 could be mounted so that it is offset and not coaxial with the throttle valve shaft 18. In an application where the throttle shaft 18 extends through or beyond the circuit board 30, the sensor 34 may be disposed axially between the throttle valve head 16 and the magnet 50. Otherwise, as shown in FIGS. 1, 2 and 4, the magnet 50 may be disposed axially between the sensor 34 and throttle valve head 16.

Positioning the center of the sensor 34 offset from the axis of rotation of the magnet 50, and axially spacing the sensor from the magnet, can provide a non-linear response of angular displacement of the magnet versus sensor output. This non-linear response may provide improved signal resolution for determining small changes in angular movement within a desired range of angular displacement, for example, rotation of 180 degrees or less. Once the axial and radial offset of the sensor 34 relative to the magnet 50 is defined, the resulting non-linear signal can be tailored or calibrated for a specific output characteristic. In one example, a throttle valve 14 used in a throttle body 10 or a carburetor usually rotates less than 90 degrees from a first position (such as fully closed or idle position) to a second position (such as a wide open position). Accordingly, desired placement of the sensor 34 relative to the magnet 50 can facilitate a more favorable signal resolution within the known range of rotation of the throttle valve 14.

The non-linear response can be controlled to be within a desired portion of a response curve, as generally shown in FIG. 11, or to provide a response curve of a desired shape. For example, the orientation of the magnet 50, and hence, the flux lines from the magnet, can be controlled to provide a response within a desired portion of a response curve for a given amount of rotation (e.g. the 90 degrees or less that a throttle valve 14 typically rotates). Consistently orienting the poles of the magnet 50 permits calibration or tuning of the sensor response so that the response is within a desired portion of the response curve. In a preferred example, the response signal may be a straight or substantially straight line between a first position of the throttle valve 14 (e.g. idle) and a second position (e.g. wide open throttle). Then, a throttle valve position between the first and second positions can be determined from a lookup table, equation or interpolation. However, the offset positioning of the sensor 34 relative to the magnet 50 may induce some non-linearity in the sensor response signal.

FIG. 11 shows three exemplary curves 70, 72, 74 for the three different magnet orientations labeled A, B and C in FIG. 12. The curves 70, 72, 74 represent controller calculated output that is based on the output signal from the sensor 34, where the sensor output signal varies as a function of the extent to which the throttle valve is open (i.e. as a function of the rotary position of the throttle valve). Upper curve 70 relates to magnet position A, middle curve 72 relates to magnet position B and lower curve 74 relates to magnet position C. The magnet positions A, B and C are designated in FIG. 12 in accordance with the position of the magnetic north pole in each orientation of the magnet, and the magnet 50 in FIG. 12 is shown in its position when the throttle valve 14 is in its first or idle position. The throttle valve 14 and magnet 50 rotate in the direction of the arrow 75.

The graph in FIG. 11 is divided into three sections (I, II and III) each representing about one-third of the throttle valve movement from idle to wide open throttle. In at least some applications, it may be desired to maintain a larger positive slope in the controller output curve at throttle valve openings at or near idle (i.e. between idle and about 20% or more of throttle movement toward wide open throttle) as compared to the rest of the throttle valve opening range because control of the air/fuel mixture can be more critical at low engine operating speeds, for example, to achieve reduced emissions and smooth engine performance. This is best achieved by the first position of the magnet 50 as shown by the upper curve 70 of FIG. 11 where the region I of that curve shows throttle valve rotation from idle to about one-third of the way to wide open throttle. Within region I or throttle valve positions, the upper output curve 70 provides the greatest change in the controller output, and hence, the greatest resolution of the output. In some applications, it may be desirable, however, to have an increased resolution in a different area of rotation of the valve, and hence, a different magnet orientation may be chosen. For example, the lower curve 72 provides the highest output resolution in region II of the curve (between, for example, about 33% and 66% throttle valve opening). And in the example shown, both the middle and lower curves 74, 72 respectively, provide higher resolution than the upper output curve 70 from about 66% throttle valve opening to wide open throttle. An output curve that has a positive slope for all or most of a particular region may also be desired or required in at least certain applications as curves that are flat (no slope) or have negative slope may make interpretation of the output signal more difficult, although it would still be possible (such as with additional means to determine rotary movement polarity, velocity or direction). Accordingly, an output signal curve with a positive slope in at least certain regions of rotary movement may be desired, but is not necessary. For best results, the slope of the output curve should be greater than zero and less than infinity (mathematically declared as an undefined slope) throughout the entire range of movement of the component being sensed. Specific curves with desired slopes in desired portions of the total range of rotation of the component being sensed can be determined empirically by testing, by simulation of the magnetic system in conjunction with the mechanical system, or simply by design requirements. If, in a given application, it is desirable to have a higher resolution of movement sensing in a certain range of movement, the sensing system can be tailored to this as described above.

Accordingly, in the example shown, magnet position A (FIG. 12) was determined to have the desired response resolution for idle and near idle throttle positions for the sensor used. In magnet position A, as best shown in FIG. 13, the north pole of the magnet 50 was offset between 35 and 55 degrees counterclockwise from a line 76 intersecting the rotational axis of the magnet 50 and the center of the sensor 34, where the magnet 50 and throttle shaft 18 rotate 90 degrees or less in the clockwise direction. In one form, the north pole of the magnet 50 was positioned 45 degrees counterclockwise from the line 76 when the throttle valve 14 was in its idle position, and the north pole was rotated to about 35 degrees or 40 degrees clockwise of the line 76 when the throttle valve 14 was in its wide open position.

Further, in implementations where the anti-rotation feature is defined at least in part by a magnet 50 having a portion of non-uniform shape, it may be desirable to control the location of the non-uniform magnet portion relative to the sensor 34 over the range of rotation of the magnet 50. In general, because the non-uniform magnet portion may cause non-uniform flux line patterns or directions, it may be desirable to prevent the non-uniform magnet portion from rotating through the area of or adjacent to the sensor 34, or past the sensor 34, to simplify the position detection and system calibration even though position detection still may be accomplished otherwise. Stated differently, the path swept by the anti-rotation feature 60 preferably remains circumferentially spaced or offset from the sensor 34. In one form, the anti-rotation feature 60 (or a center thereof) may be disposed about 135 degrees clockwise from the line 76 intersecting the magnet axis and center of the sensor 34. In this orientation, when the throttle shaft 18 rotates about 90 degrees clockwise, the anti-rotation feature 60 gets no nearer to the sensor 34 than its starting position so it does not significantly affect the rotary position determination, but greatly aids in retaining the desired orientation of the magnet 50.

The operation of the sensor 34, and various other circuit components like A/D converters, amplifiers and the like, may be constructed and arranged as shown in U.S. Patent Application Ser. No. 61/094,973, from which this application claims priority as a continuation-in-part. Accordingly, the description of the related circuitry and components will not be further described herein.

It should be appreciated that the systems, circuits, components and methods described above are only exemplary in nature and that one of a number of different alternatives could be used. For instance, any combination of the following components could be used: magnetic flux or field influencing components, additional magnets including bias magnets, Hall effect sensors, contact-type sensors, optical sensors, multiple magnets, magnets other than arcuate shaped magnets, a single-bridge sensor having only one resistive bridge, temperature compensation means, low profile rotary sensors such as PIHER sensors, etc. These are, of course, only some of the possibilities.

Other forms of non-contact rotary position sensors instead may be used. For example, a metallic paddle (not shown) may be attached to the throttle shaft in close proximity to sets of spiral curves (not shown) etched into the surface of the circuit board. The curves may be excited by a carrier or demodulated waveform and, as the paddle scans the circular matrix, the control module could detect the difference in waveforms signal between the two curve sets as the paddle scans proportional to the commanded throttle position, thereby providing an indication of engine load without typical noise or step signal constraints imposed by more costly and conventional electromechanical or electro-resistive rotary position sensing devices.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

What is claimed is:

1. A rotary position sensor assembly for determining the rotary position of a rotary component, comprising:
   a rotor with an axis of rotation and constructed and arranged to be connected to a rotary component for rotation in unison with the rotary component;
   a circumferentially continuous annular permanent magnet carried by the rotor for rotation in unison with the rotary component through an angular movement of not more than 180° and having an anti-rotation flat or cutout portion adjacent its periphery engaging a complimentary portion of the rotor to prevent rotation of the magnet relative to the rotor;
   at least one magnetoresistive sensor responsive to a characteristic of a magnetic field that changes as the magnet rotates or is rotated about the axis of rotation, radially spaced from the axis of rotation, axially spaced from the magnet and provides a non-linear output signal in response to rotation of the magnet; and
   the sensor is located relative to the magnet flat or cutout portion so that the flat or cutout portion is circumferentially spaced from the sensor throughout the rotary movement of the magnet and the path swept by the anti-rotation flat or cutout portion does not circumferentially overlap the sensor during rotation of the rotor.

2. The assembly of claim 1 wherein the magnet is arranged so that its north pole is between about 150 and 210 degrees of rotation offset from the anti-rotation feature.

3. The assembly of claim 1 wherein the sensor is radially offset from the rotational axis of the magnet by a distance greater than the diameter of the magnet and less than or equal to the diameter of the magnet plus 12 mm.

4. The assembly of claim 1 wherein the rotary component rotates less than 90 degrees and the magnet and the sensor are arranged so that the slope of a graph of the output signal of the sensor versus degrees of rotation of the rotary component is positive over at least half of the range of rotation of the rotary component.

5. The assembly of claim 4 wherein the rotary component rotates less than 90 degrees and the magnet and sensor are arranged so that the slope of a graph of an output signal from the sensor versus degrees of rotation of the rotary component is positive over the range of rotation of the rotary component.

6. The assembly of claim 4 wherein the magnet and sensor are arranged so that the slope of the output signal varies over the range of rotation of the rotary component and the slope of the output signal is largest in a predetermined portion of the range of rotary component rotation.

7. The assembly of claim 6 wherein the slope of the output signal is largest between a first position of the rotary component and at least about 20% of the movement of the rotary component toward its second position, wherein the first position and second position define the range of rotation of the rotary component.

8. An apparatus, comprising:
a body having an air passage through which air flows;
a valve rotatable relative to the body and having a valve shaft and a valve head carried by the valve shaft for rotation relative to the air passage through an angular movement of less than 180° between a first position at a first degree of opening and a second position at a second degree of opening that is greater than the first degree of opening;
at least one magnetoresistive sensor carried by the body and responsive to a characteristic of a magnetic field that changes as the magnetic field moves; and
a circumferentially continuous annular permanent magnet carried by the valve shaft for co-rotation with the valve shaft and having an anti-rotation flat or cutout portion adjacent its periphery engaging a complimentary portion of a rotor component to prevent rotation of the magnet relative to the valve shaft to maintain a predetermined rotary position of the magnet relative to the shaft;
the at least one sensor is radially spaced from the axis of rotation, axially spaced from the magnet and located relative to the magnet flat or cutout portion so that the flat or cutout portion is circumferentially spaced from the sensor throughout the rotary movement of the magnet; and
the anti-rotation flat or cutout portion is circumferentially offset from the sensor and does not rotate through the area of the sensor during rotation of the valve shaft.

9. The apparatus of claim 8 wherein the body includes a projection in which the valve shaft extends, the sensor is carried by a housing that is carried by the projection, and a rotor component is carried at an end of the valve shaft in the area of the sensor with the magnet carried by the rotor component.

10. The apparatus of claim 9 which also includes a circuit board carried by the housing with the sensor carried on the circuit board, the circuit board being located between the sensor and the magnet.

11. The apparatus of claim 8 wherein the magnet and sensor are arranged so that the slope of an output signal from the sensor versus degrees of rotation of the valve shaft is positive over the range of rotation of the valve shaft.

12. The apparatus of claim 10 wherein the sensor includes a plurality of magneto resistive (MR) elements arranged as a pair of angularly offset resistive bridges, and the rotary position sensor is mounted to the circuit board and magnetically interacts with the magnet.

13. The apparatus of claim 8 wherein the sensor and magnet are arranged so that: i) a surface of the rotary position sensor is generally parallel to a rotating magnetic field caused by the magnet, ii) the rotary position sensor is axially spaced from the magnet, and iii) the rotary position sensor is not coaxial with the rotating shaft.

* * * * *